July 24, 1973   S. D. PHILIPPS   3,748,112
APPARATUS FOR TRANSFER OF PARTICULATE MATERIAL IN GLASS MELTERS
Filed Sept. 17, 1970   6 Sheets-Sheet 4

INVENTOR.
SAMUEL D. PHILIPPS
BY
Staelin + Overman
ATTORNEYS

July 24, 1973   S. D. PHILIPPS   3,748,112
APPARATUS FOR TRANSFER OF PARTICULATE MATERIAL IN GLASS MELTERS
Filed Sept. 17, 1970   6 Sheets-Sheet 6

INVENTOR.
SAMUEL D. PHILIPPS
BY
*Staelin & Overman*
ATTORNEYS

United States Patent Office 3,748,112
Patented July 24, 1973

3,748,112
APPARATUS FOR TRANSFER OF PARTICULATE
MATERIAL IN GLASS MELTERS
Samuel D. Phillips, Welsh Hills Road,
Granville, Ohio 43023
Filed Sept. 17, 1970, Ser. No. 72,905
Int. Cl. C03b 3/00
U.S. Cl. 65—335                        12 Claims

ABSTRACT OF THE DISCLOSURE

Apparatus for transferring particulate material to a high temperature region for thermal processing including means for intermittently transporting particulate material from a location away from the high temperature region to a location at a collection surface in the high temperature region and means for releasing the particulate material from the location at the surface.

BACKGROUND OF THE INVENTION

Supplying batch to a melter holding molten glass has proven to be vexing, especially with smaller melters supplied with batch in comminuted form.

Because heat radiated by molten glass in a melter is intense, there arose the practice of supplying batch mineral material in comminuted form to a melter by dropping the batch from a location spaced a distance above the melter. While such technique provides adequate amounts of batch to a melter, the practice is fraught with difficulties. For example, thermal currents tend to carry falling batch particles throughout areas associated with the melter. When the melter supplies molten glass in a glass fiber forming operation, the dusty conditions from airborne batch particles can be pernicious to the process in addition to creating a miserable housekeeping problem. Batch particles at the glass fiber forming zone tend to break fibers. Such conditions exist even where apparatus employs a hood.

Additionally, the batch drop practice can uncontrollably vary molten glass composition in a melter. Because batch in comminuted form includes components of different particle sizes and densities, not all particles fall in the same manner. While the heavier particles tend to fall more directly downwardly onto the molten glass, thermal currents and other air movement tend to divert the smaller falling batch particles to upper refractory regions of a melter. These smaller particles of batch accumulate to become mounds sloping downwardly towards the surface of the molten glass within the melter. When accumulation is sufficient, portions collapse into the molten glass.

Intense heat from molten glass in a melter effects even batch held in supply hoppers above the melter. The heat tends to make the surface of batch particles cohesive, such cohesiveness tending to "cake" the batch particles together. "Caking" in hoppers tends to interrupt free discharge of batch from the hoppers.

SUMMARY OF THE INVENTION

An object of the invention is improved apparatus for transferring particulate material to a high temperature region for thermal processing.

Another object of the invention is improved apparatus for changing high temperature fusing mineral material into a molten body.

Another object of the invention is apparatus for changing high temperature fusing fiberizable batch mineral material into molten glass that is substantially free from dusting of the batch material.

Yet another object of the invention is improved apparatus for supplying batch mineral material to a molten body of glass.

Still another object of the invention is means for charging a melting receptacle by intermittently carrying batch mineral material from a location away from the melting receptacle to a location at the surface of molten glass in the receptacle and releasing the batch from the location at the surface to accumulate on the molten glass.

These and other objects are attained by apparatus for transferring particulate material to a high temperature region that includes transport means for carrying particulate material from a location away from the high temperature region to a location at a collecting surface in the region and means for releasing the material from the transport means at the location to discourage tendencies for particles to disperse to the atmosphere. The apparatus moves the transport means away from the high temperature region sufficiently quickly after release of the particulate material to keep the temperature of the transport means substantially below the temperature in the high temperature region.

Other objects and advantages of the invention will become apparent as the invention is described hereinafter in more detail with reference made to the accompanying drawings.

DESCRIPTION OF THE PREFERRED EMBODIMENTS

While the invention finds particular use in manufacturing glass filaments, one may use the invention in processing heat softenable material generally. The use of glass filament forming apparatus is an example only to explain the operation of the invention.

Figure 1:
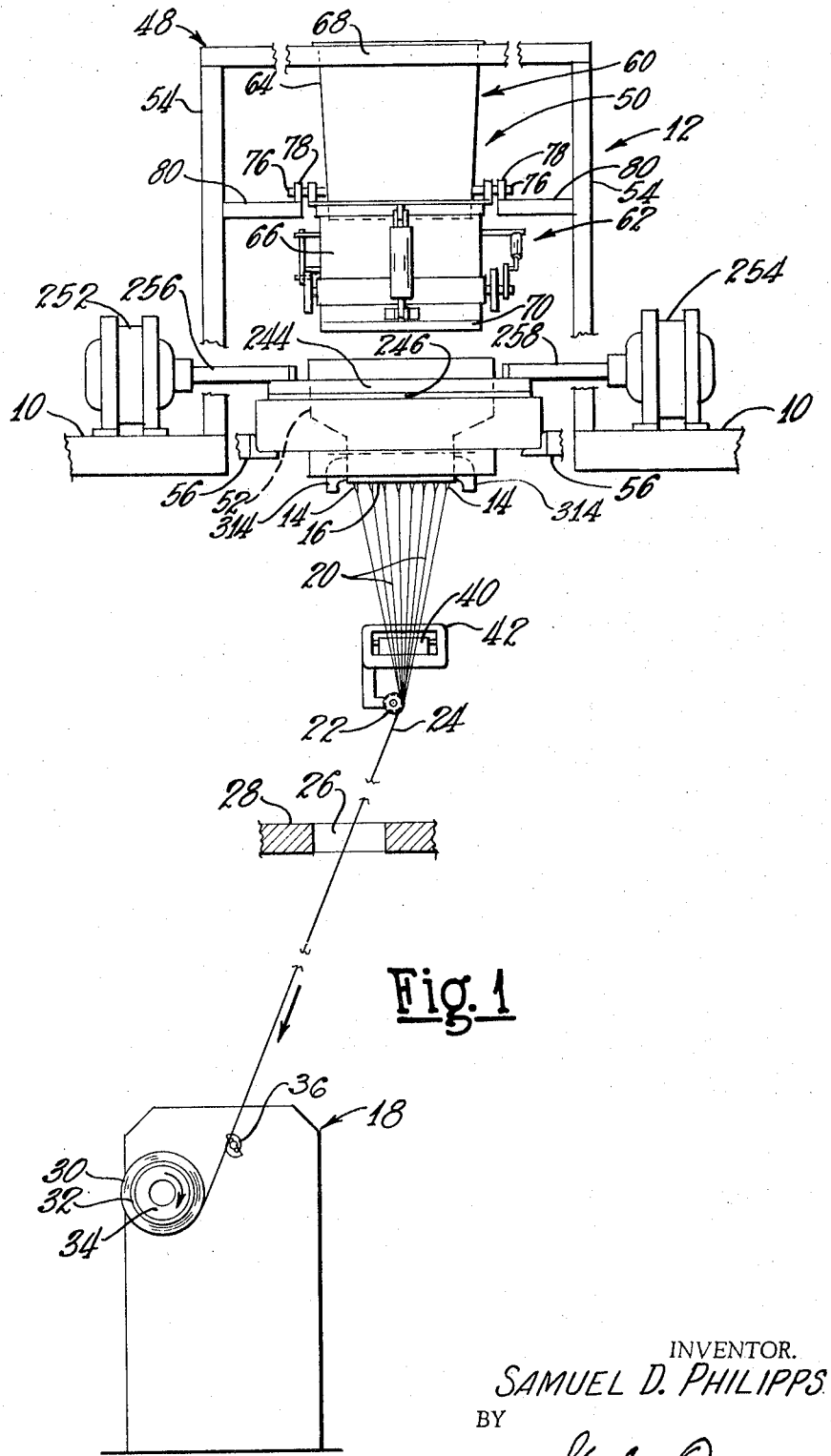
FIG. 1 is a front elevation view of apparatus for producing continuous filament glass strand according to the principles of the invention.
Figure 2:
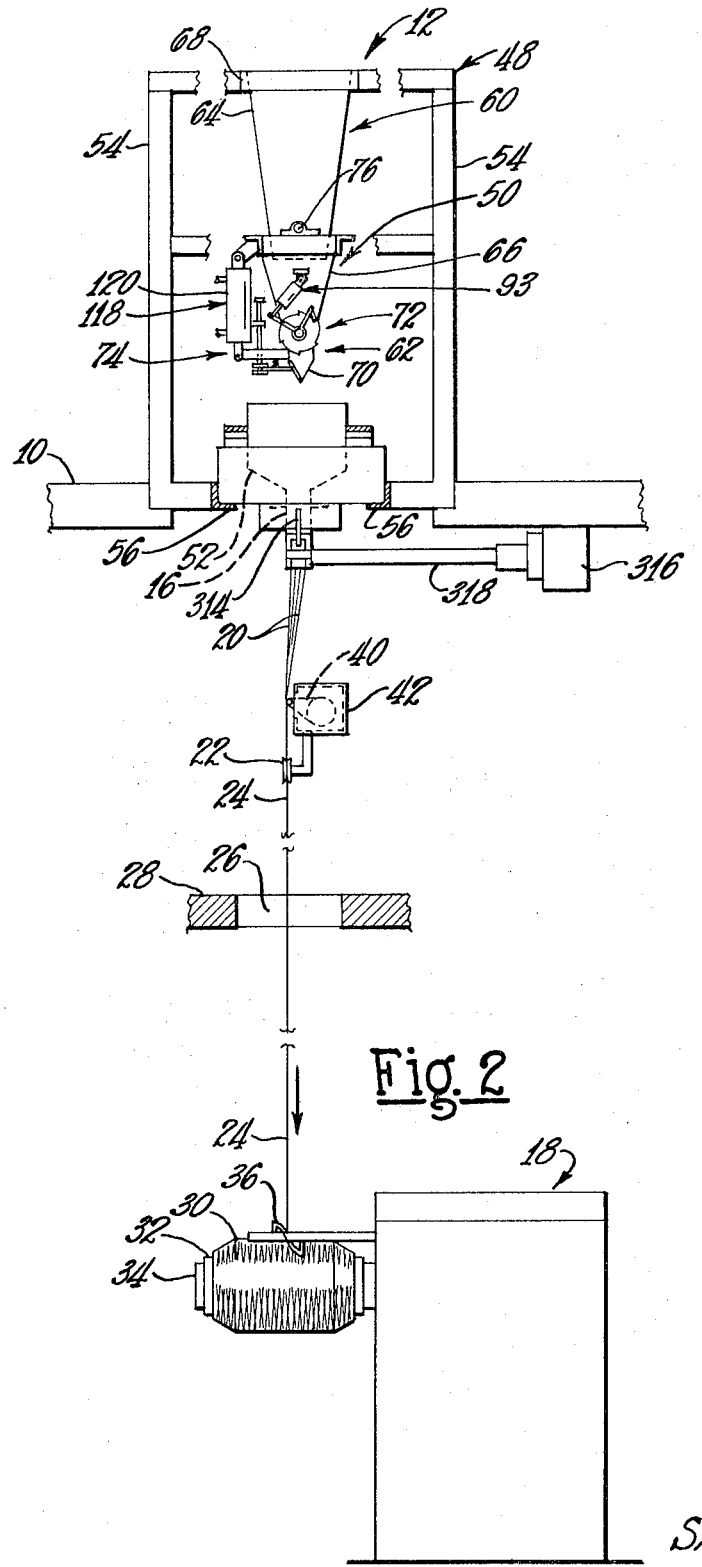
FIG. 2 is a side elevation view of the apparatus illustrated in FIG. 1.

FIGS. 1 and 2 show apparatus on three levels, operating to produce continuous filament glass strand that collects as a wound package on a winder. As illustrated, an upper level floor 10 between the upper and intermediate levels supports a processing assembly 12 that supplies molten glass streams 14 from a feeder or bushing 16. A winder 18 on the lower level attenuates the molten glass streams 14 into continuous glass filaments 20. A gathering shoe 22 at the intermediate level combines the advancing continuous filaments 20 into a glass strand 24. The winder 18 advances the strand 24 downwardly through an opening 26 in the intermediate floor 28 to wind the strand 24 as a package 30 on a suitable collector such as a tube 32 telescoped onto a collet 34. Apparatus within the winder 18 rotates the collect 34. A reciprocatable and rotatable strand traversing means 36 swiftly moves the advancing strand 24 back and forth lengthwise of the collecting tube 32 to distribute the strand 24 on the package 30.

At the intermediate level an applicator 40 supported within a housing 42 applies sizing liquor or other coating material to the advancing filaments 20. The applicator 40 may be any suitable means known to the art such as an endless belt that moves to pass through a sizing liquid or other coating material held in the housing 42. As the filaments 20 speed across the surface of the moving applicator 40, some of the sizing liquid or other coating material on the applicator transfers to the filaments.

The processing assembly 12 includes a frame 48 supporting a batch feeding section 50; a melting receptacle or melter 52 that converts batch mineral material supplied from the batch feeding section 50 into molten glass; and the feeder or bushing 16 that receives molten glass from the melter 52. The frame 48 includes vertical portions 54 and horizontal bottom portions 56. In the embodiment illustrated, the batch feeding section 50 includes batch supply portion 60 and a batch distributing portion 62 that cooperate to provide batch material in particulate or comminuted form to the body of molten glass held in the melter 52. While the embodiment shown operates in a preferred manner to continuously provide a layer of batch material in comminuted form over the surface of the body of molten glass in the melter 52, the apparatus of the embodiment can operate without providing the layer of batch material over the surface of the molten glass.

The batch supply portion 60 positions a relatively stationary hopper 64 with a supply batch mineral material in comminuted form at a location a distance above the melter 52 away from the intense heat of the molten glass. Immediately below the hopper 64 is a supplemental hopper 66 that is part of the batch distributing portion 62. The arrangement as shown places the lower batch discharge end of the stationary hopper 64 at the upper entrance of the supplemental hopper 66. Cross members 68, which form part of the frame 48, hold the relatively stationary hopper 64 in position above the supplemental hopper 66.

The batch distributing portion 62 supplies particulate batch mineral material to the melter 52 by intermittently operating transport means to carry the batch mineral material in comminuted form from the supplemental hopper 66 to a location at the surface of molten glass in the melter 52 and operating the transport means to release batch to the collecting surface of the molten glass from the location at the surface. In the embodiment shown the basic distributing portion 62 includes the support hopper 66, a transport container 70 movably mounted adjacent to the outlet of the supplemental hopper 66, transfer means 72 for moving batch mineral material from the supplemental hopper 66 to the container 70, container support means 74 for moving the container 70 downwardly from its location adjacent the outlet of the hopper 66 to locations in the high temperature region at the surface of the molten glass in the melter 52, means for discharging the batch mineral material from the container 70 and means for returning the container 70 to its position adjacent to the outlet of the supplemental hopper 66.

In the arrangement the supplemental hopper 66 is a longitudinal trough shaped container pivotally mounted at its upper region on a shaft 76 held in journal bearings 78 carried by cross members 80 on the frame 48. Accordingly, the supplemental hopper 66 is swingable or oscillatable about the axis of the shaft 76. The bottom of the hopper 66 has an outlet opening extending substantially its entire length and communicating with the batch transfer means 72.

As one can more clearly see in FIGS. 3–6, the batch transfer means 72 is a rotary metering arrangement including a tubular housing 82, a shaft 84 and longitudinal partitions 86 circumferentially spaced apart on the shaft 84. The shaft 84 extends lengthwise through the tubular housing along the housing's longitudinal axis; the shaft 84 is free to rotate. The partitions 86 extend radially of the shaft 84. Together with end walls 88 the partitions 86 form a number of longitudinal compartments 90 on the shaft 84. The tubular housing 82 has an entrance opening 91 communicating with the exit opening of the supplemental hopper 66. The compartments 90 receive batch mineral material from the hopper 66 through the opening 91. The tubular housing 82 has a discharge opening 92 through which batch mineral material discharges from the compartments 90 into the transport container 70.

The transfer means 72 includes means for moving the shaft 84 in steps about its axis of rotation. Such means include an air motor 93, a link 94 and a ratchet arrangement including a ratchet wheel 96 and a pawl 98. The air motor 93 includes a cylinder 100, a piston 102 and piston rod 104 slidable in the cylinder 100. A bracket 106 on the supplemental hopper 66 pivotally holds the cylinder 100 at its upper end. The piston rod 104 pivotally connects to one end of the link 94; the other end of the link 94 and one end of the pawl 98 are fixed to a collar 108 that is movable on the shaft 84. A suitable means supplies air under pressure to the cylinder 100 through air lines 110 and 112.

Figure 3:
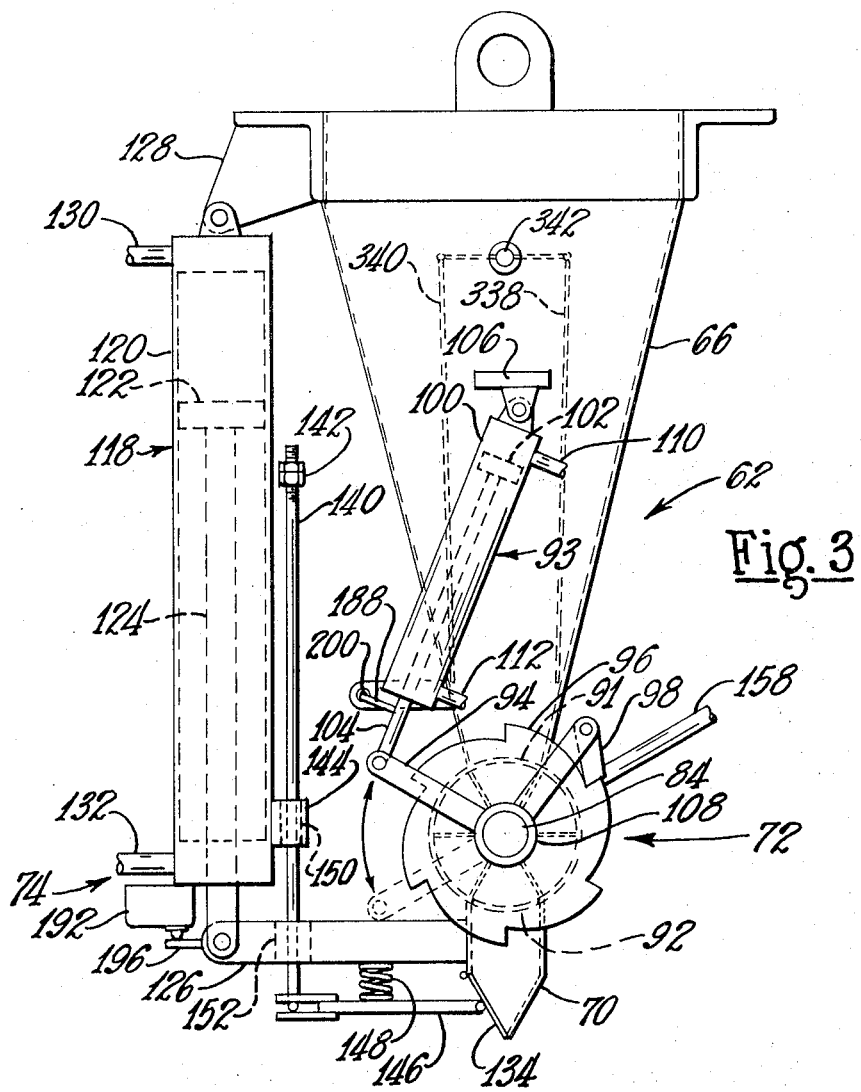
FIG. 3 is an enlarged end elevation view of the apparatus supplying batch mineral material to the melter shown in FIGS. 1 and 2.

The air motor 93 intermittently moves the shaft 84 in steps about its axis to bring individual compartments 90 into registered communication with the outlet of the supplemental hopper 66. When air enters the cylinder 100 through air line 112, air pressure pushes the piston 102 to move the piston rod 104 into the cylinder 100. As the piston rod 104 moves into the cylinder 100, it carries the link 94, which moves the shaft 84 by operation of the pawl 98 on the ratchet wheel 96 in a clockwise direction as seen in FIG. 3. Such movement brings an empty compartment 90 into alignment with the outlet of the supplemental hopper 66 and advances a loaded compartment 90 to one side of the outlet. When air enters the cylinder 100 through the air line 110, air pressure acts against the piston 102 to extend the piston rod 104 from the cylinder 100. Movement changes the rotational position of the collar 108 through the link 94 to place the pawl 98 for subsequently stepping the ratchet wheel 96 clockwise.

The support means 74 holds the transport container 70 to receive batch mineral material from the compartments 90 through the outlet 92 of the cylindrical housing 82. As shown, the support means 74 includes an air motor 118, which includes a cylinder 120, a piston 122 and a piston rod 124, and a support member 126. As shown, the air motor 118 rigidly depends vertically from a bracket 128 at the upper portion of the supplemental hopper 66. One end of the support member 126 rigidly fastens to the piston rod 124, the member 126 extending generally horizontally to connect to the container 70 at its other end. A suitable source supplies air under pressure to the cylinder 120 through air lines 130 and 132.

When air enters the cylinder through air line 132, air pressure operates on the piston 122 to move the piston rod 124 downwardly towards the melter 52. When air enters the cylinder through air line 132, air pressure within the cylinder 120 operates against the piston 122 to move the piston rod 124 upwardly away from the melter 52.

Working with the support means 74 is a batch release arrangement for the container 70. As one can more readily see in FIGS. 3 and 5, the container 70 has a door 134. A door actuating means operates to open the door 134 when the container 70 arrives at a predetermined location at the surface of molten glass in the melter 52 and includes an actuating rod 140 with an actuating cap 142, a stop 144, a link 146 and a spring 148. The arrangement orients the actuating rod 140 to extend vertically downwardy through an opening 150 in the stop 144, which is on the cylinder 120, and thence through an opening 152 in the support member 126. The opening 150 is smaller than the actuating cap 142. The lower end of the actuating rod 140 is pivotally held by one end of the link 146, which connects at its other end to the door 134. The spring 148 resiliently supports the actuating rod 140 and the link 146 on the support member 126. The spring 148 maintains the link 146 and support member 126 in predetermined generally spaced apart relation during times the apparatus does not operate to open the door 134.

When air motor 118 moves the piston rod 124 downwardly, the support means 74 and the batch release arrangement move downwardly together until the actuating cap 142 engages the stop 144. Because the actuating cap 142 is larger than the stop opening 150, the cap 142 engages stop 144, which upon such engagement precludes additional downward movement of the actuating rod 140. The piston rod 124 continues its downward travel after engagement of the cap 142 and stop 144. Because the transport container 70 is on the support member 126, the container 70 continues its downward travel with the piston rod 124; however, the door 134 of the container 70 connects to the link 146, which stops its downward movement upon engagement between the cap 142 and stop 144. Consequently, the link 146 restricts travel of the door 134. Because the link 146 restricts the downward travel of the door 134, the door pivots open to release batch mineral material in the container 70 to the melter 52.

The arrangement can vary the location from which the transport container 70 releases batch mineral material. For example, one can vary the stroke of the air motor 118 and appropriately change the location of the stop 144.

The batch distribution portion 62 further includes means for locating the transport container 70 at different locations across the molten glass in the melter 52. In the embodiment shown, apparatus moves the supplemental hopper 66 about the axis of the shaft 76. As more plainly seen in FIG. 5, a wheel 156 is on the other end of the shaft 84 and moves with the shaft; the embodiment keys the wheel 156 on the shaft 84. A crank 158 pivotally mounts on the wheel 156 at a location laterally spaced from the wheel's axis of rotation. The crank 158 extends in a direction normal to the shaft 84 and secures at its other end to a vertical portion 54 of the frame 48.

The air motor 93 intermittenly moves the wheel 156 with the transfer means 72 through the shaft 84. When air enters the cylinder 100 through the air line 112, air pressure pushes the piston 102 to move the piston rod 104 into the cylinder 100. Such movement of the piston rod steps the ratchet wheel 96 through the link 94 and pawl 98. The shaft 84 moves with the ratchet wheel 96.

Because one end of the crank 158 is stationary on the frame 48, stepped movement of the wheel 156 about its axis of rotation moves the supplemenal hopper 66 about the axis of the shaft 76. Such movement changes the location of the transport container 70 across the molten glass held in the melter 52. The dashed lines in FIG. 6 indicate such changes in container location.

A brake 160 frictionally engages the circumferential surface of the wheel 156 to hold the position of the wheel as the air motor 93 changes the position of the pawl 98 to engage the ratchet wheel 96 for the next stepped clockwise motion of the shaft 84.

Figure 8:
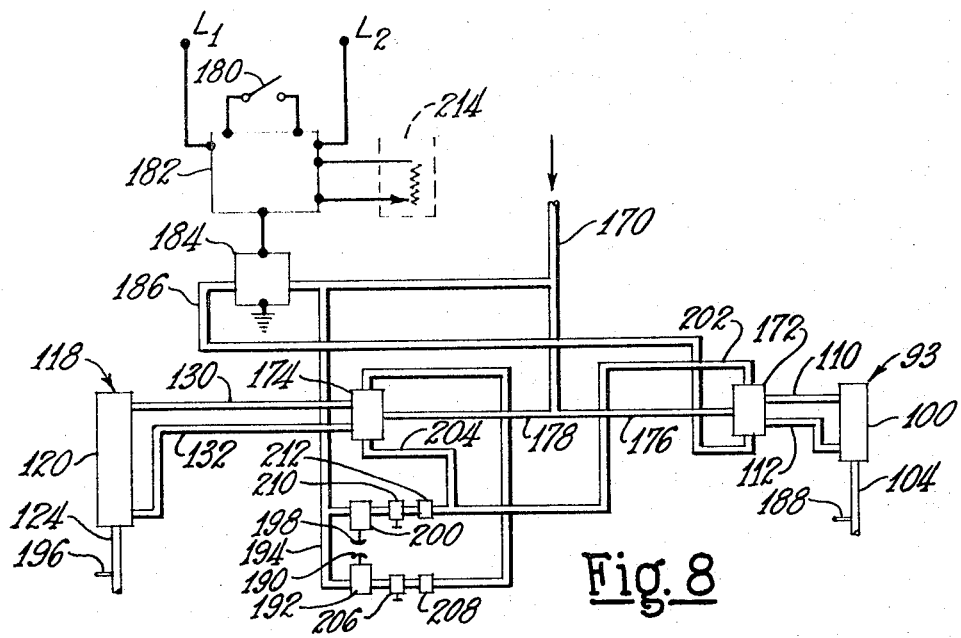
FIG. 8 is a diagram of a control arrangement for the supply apparatus shown in FIGS. 3–5.

Suitable controls regulate the operating sequence of the apparatus comprising the batch distributing portion 62. FIG. 8 illustrates a suitable pneumatic control arrangement including a power air section and a control air section. The power air section includes a main air supply tube 170 providing air under pressure from apparatus supplying such air to four way valves 172 and 174 through the plying such air to four way valves 172 and 174 through tube portions 176 and 178, respectively. The control section moves spool valve portions within the valves 172 and 174 to regulate air entry into the air motors 93 and 118 respectively.

The control air section includes a network of tubes, valves and switches. A switch 180 completes a circuit that supplies electrical power to a timer 182 through leads $L_1$ and $L_2$. The timer 182, which controls time between batch supply cycles to the melter 52, begins a cycle by pulsing electrical current to a normally closed solenoid valve 184 located along the length of a supply tube 186. When the solenoid valve 184 opens and closes, it supplies air under pressure to one end of the four way valve 172 to move that valve's spool valve portion to introduce power air to the air motor 93 through air line 112. Air introduced within the cylinder 100 through air line 112 retracts the piston 104. As the piston 104 retracts, an arm 188 on the piston rod moves a switch 190 that actuates a valve 192 located along the length of a supply tube 194. When the valve 192 opens, the supply tube 194 provides air under pressure from the main supply tube 170 to one end of the four way valve 174. Air from the tube 194 moves the spool valve portion within the valve 174 to introduce air within the air motor 118 through the supply tube 130 to extend the piston rod 124 from the cylinder 120. As the piston rod 124 extends, an arm 196 on the piston rod 124 contacts a switch 198 to actuate a valve 200. This valve supplies air under pressure from tube 194 to the other end of each of the four way valves 172 and 174 through tube portions 202 and 204, respectively. Air released to these valves moves their spool valve portions; valve 172 now supplies air to the cylinder 100 through air supply tube 100 and four way valve 174 now supplies air to the cylinder 120 through the air supply tube 132. The piston rod 124 retracts; the piston rod 104 extends.

Both cylinders 100 and 120 include air release valves to permit escape of air from the cylinder as air pressure is introduced into the cylinder to either extend or retract the piston rods.

The control arrangement shown in FIG. 8 includes choke 206 and volume 208 providing a delay to movement of the transport container 70 downwardly after the container 70 receives batch mineral material from the transfer means 72. Moreover, the control arrangement provides a choke 210 and a volume 212 providing a delay to the upward movement of the transport container 70 after release of batch mineral material from the container 70 to the melter 52.

The timer 182 includes a time delay rheostat 214 that controls the time between cycles of the transport container 70.

In operation the batch distributing portion 62 intermittently carries batch mineral material from the supplemental hopper by a transport means to a location at the surface of molten glass in the melter 52. A cycle begins as the batch transfer means 72 supplies batch mineral material to the transport container 70. After a slight delay to permit batch dust to settle in the container 70, the support means 74 moves the container 70 from the outlet of the supplemental hopper 66 downwardly to a location at the surface of the molten glass in the melter 52. The door actuating means opens the door 134 of the container 70 to discharge the batch mineral material to the collecting surface of the molten glass. After a short delay the support means 74 moves the transport container 70 upwardly to its initial location adjacent the outlet of the supplemental hopper 66. The delay is sufficiently short after release of the particulate batch to maintain the temperature of the transport container 70 substantially below the temperature in the high temperature region of the melter 52. A delay of from 1 to 5 seconds is usually normally adequate.

In operation movement of the wheel 156 on the shaft 84 progressively moves the location of the container 70 back and forth across the interior of the melter 52 to vary the batch discharge locations. These locations are sufficiently close to provide a continuous layer of batch mineral material across the surface of the molten glass in the melter 52. While the embodiment shown in FIGS. 1–7 steps the location of the container 70 back and forth across the interior of the melter 52, it is possible to modify the sequence. For example, it is possible to step the location of the container 70 in a direction across the melter 52 and then quickly return the container 70 to its initial position for again stepping the location of the container across the melter 52.

While the embodiment shown in FIGS. 1–7 shows a simple transport container arrangement, it is possible to use other transport means for intermittently carrying batch mineral material to the molten glass in the melter 52.

While it is normally desirable to discharge the batch mineral material from the container 70 from a location closely adjacent to the layer of batch material on the molten glass, it may be advantageous under some conditions to release the batch material directly onto the surface of the molten glass. It has been useful to discharge the batch mineral material from the transport container 70 to fall from ¼ to 2 inches onto the surface of the molten glass. The release locations at the surface of the molten glass discourages tendencies for batch particles to disperse to the atmosphere.

Figure 7:
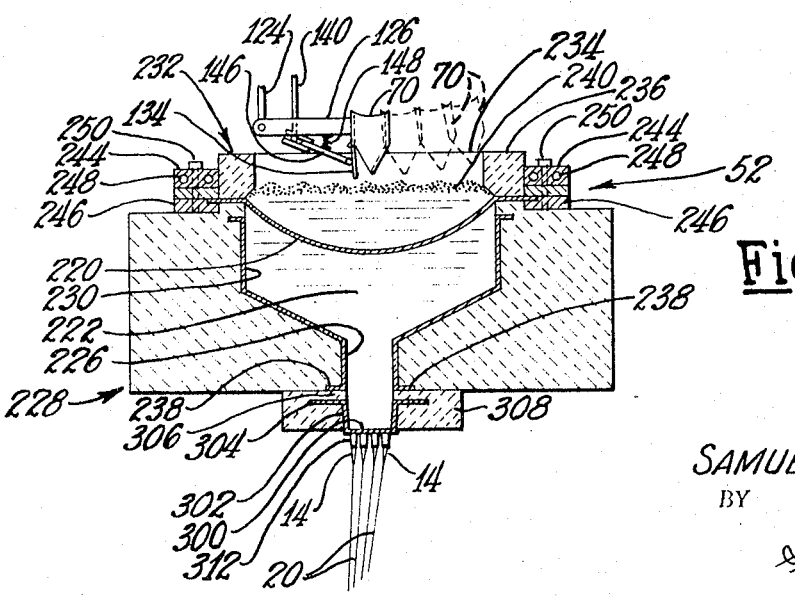
FIG. 7 is an enlarged longitudinal sectional view of a melter and feeder construction forming part of the apparatus shown in FIGS. 1 and 2.

FIG. 7 shows the construction of the melter 52 and feeder or bushing 16 combination forming part of the processing assembly 12 shown in FIGS. 1 and 2. The melter 52 converts batch mineral material to molten glass through heat supplied by a current conducting heating element 220 across the interior or melting chamber 222 of the melter 52. The heating element disclosed is a curved longitudinal strip having perforations 224 through which molten glass travels along its path to the feeder 16. Molten glass in the melter 52 flows into the feeder 16 through a melter outlet passageway 226.

The melter 52 comprises a refractory portion 228, a liner 230 and a heating arrangement including the heating element 220.

The refractory portion 228 is built of temperature resistant refractory block. Supported upon the refractory portion 228 is a second refractory construction 232 comprising lengthwise extending blocks 234 and transversely extending blocks 236. These blocks define an entrance region to the melter 52.

The liner 230 conforms to the interior arrangement of the blocks making up the refractory construction of the melter 52 to define the melting chamber 222. Because the liner 230 must not deteriorate appreciably under high melting temperatures generally present during the operation of the melter 52, it has been customary to make the liner 230 of a platinum or a platinum alloy such as an alloy containing a substantial percentage of rhodium. It is possible to use other high temperature resisting materials for the liner 230.

The liner 230 is not electrically energized; it is separated electrically from electrical circuits and supplies. The lower poriton of the liner 230 defines the outlet passageway 226 and terminates at its lower portion with flanges 238.

An electrical arrangement supplies low voltage and high amperage electrical energy to the heating element 220. The electrical arrangement supplying current to the heating element, and including the heating element 220, is electrically separate from the liner 230. Intense heat generated from passing electrical current through the heating element 220 changes the batch mineral material to the molten glass. The position of the heating element 220 is under the surface of the molten glass in the melting chamber 222. The upper surface of the molten glass is covered by a layer 240 of unmelted batch mineral material supplied to the melter 52 by the transport container 70.

Current carrying bus bars support the current conducting heating element 220. As shown, two sets of bus bars, viz bus bars 244 and 246, each extend lengthwise along the upper surface of the refractory portion 228. Cooling tubes 248 extend through each of the upper and heavier bus bars 244 to carry cooling water that controls the temperature of the bus bars. The upper flanges of the heating element 220 are squeezed between the bus bars by bolts 250.

The electrical arrangement supplies electrical current to each set of bus bars 244 and 246 and consequently to the elements 220 from transformers 252 and 254 through conductors 256 and 258, respectively.

Figure 9:
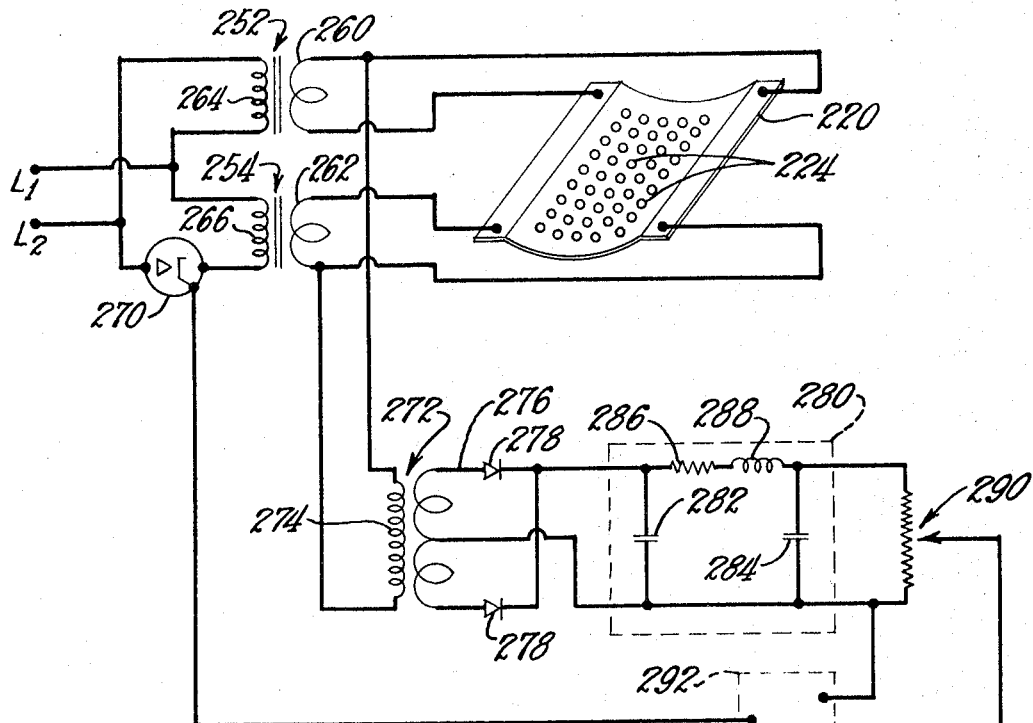
FIG. 9 is a diagram of an electrical supply arrangement and control circuit for the heating element in the melting chamber shown in FIG. 7.

FIG. 9 shows a circuit for controlling electrical energy supplied to the heating element 220 from the transformers 252 and 254 and consequently generally controlling the thermal energy emitted by the heating element 220.

As shown, the secondary 260 of the power transformer 252 and the secondary 262 of the power transformer 254 connect across opposite ends of the heating element 220. Suitable electrical means supplies the primaries 264 and 266 of the power transformers 252 and 254, respectively, with electrical power through leads $L_3$ and $L_4$. The electrical power to the leads $L_3$ and $L_4$, for example, may be 60 cycles alternating current of 440 volts. The secondaries 260 and 262 reduce the voltage from the primaries 264 and 266 to provide around 5 to 6 volts to the heating element 220 with sufficiently high current flow, for example 5,000 amps, to heat the element 220 by resistance heating to the high temperatures needed in the melter 52 to convert the batch mineral material into molten glass for delivery to the feeder 16.

A circuit control using a silicon controlled rectifier 270 senses voltage variations caused by resistance changes in the heater element 220; changes in resistance may occur, for example, upon interruption of normal glass flow from the feeder 16 occurring as the winder 18 completes a package 30 and an operator puts a new collector on the collet 34. The sensing circuit modifies the power supply current to restore a predetermined temperature to the heater strip 220 for better control of molten glass flow through the melter 52 to the feeder 16. Because the time-constant characteristics of the silicon controlled rectifier 270 are small, any deviation from a preselected flow rate is at a minimum.

As shown, the control circuit uses a control transformer 272 with its primary 274 connected across the ends of the heater element 220. The transformer 192 preferably provides a four to one reduction voltage; accordingly, the circuit uses a center top secondary 276. Diodes 278 rectify the current in the secondary 276. A pi filter circuit 280 receives the rectified current. The pi filter circuit 280 comprises a pair of parallel connected condensers 282 and 284 having interposed between them a resistance 286 and an inductance 288 connected in series.

The resulting direct current output from the pi filter circuit 280 is applied across a voltage divider 290 that gives an exceedingly small output signal, for example 10 millivolt DC output, to a control unit 292 of conventional construction. The silicon control rectifier 270 receives the output of the control unit 292. The silicon control rectifier 270 holds the time-constant factor of the power circuit below one-quarter cycle.

The voltage sensing circuit is a more rapid sensing system than a thermocouple system. Through the electrical supply and control arrangement shown in FIG. 9, the melter 52 provides a more stable temperature for melting batch mineral material to molten glass as the winder 18 attenuates glass fibers from the molten streams supplied at the outlets of the feeder 16. The result is glass fibers of more uniform dimensions throughout package build and between packages.

The feeder 16, which is beneath and in registry with the melter outlet passageway 226, includes a bottom wall 300 and side walls 302 that terminate with laterally extending flanges 304. High temperature resistant insulation and insulating members 306 thermally and electrically insulate the flanges 304 of the feeder 16 from the bottom flanges 238 of the liner 230. High temperature resistant refractory 308 surrounds the exterior of the feeder 16. Frame members 130 support the high temperature resistant refractory 308 in a conventional manner.

As in the case of the liner 230 and the current conducting heating element 220, the bottom wall 300 and side walls 302 are made of platinum or an alloy of platinum.

A group of orificed tips or tubular projections 312 extend from the exterior of the bottom wall 300. It is through these tubular projections 312 that molten glass discharges from the feeder 16 in the form of the molten glass streams 14.

The side walls 302 have terminals 314 that receive electrical energy from a power transformer 216 through conductors 218. Electrical current supplied to the feeder 16 through the terminals 314 heats the feeder 16 by resistance heating to maintain the molten glass in the feeder at desired temperatures and viscosities.

Figure 4:
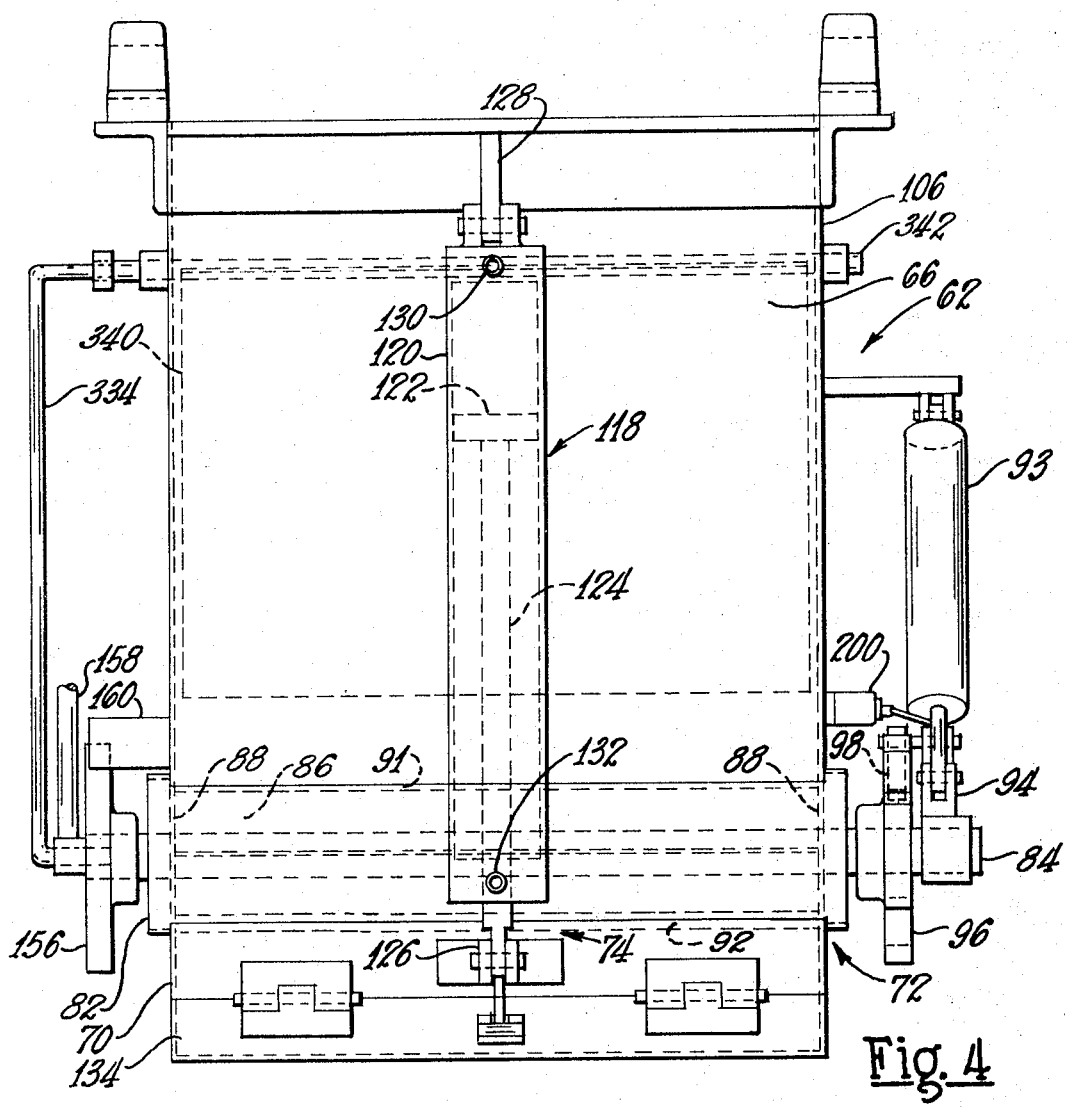
FIG. 4 is an enlarged front elevation view of the apparatus shown in FIG. 3.
Figure 6:
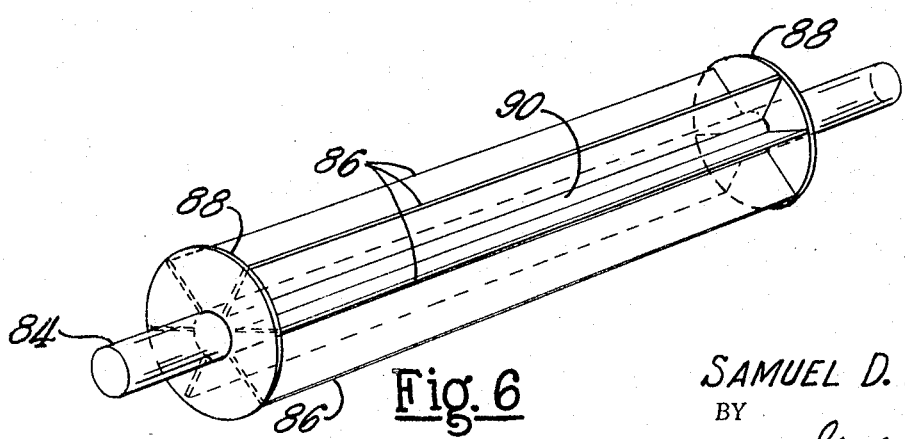
FIG. 6 is a perspective view of a portion of the rotary transfer means used as a component with the apparatus shown in FIGS. 3–5.
Figure 5:
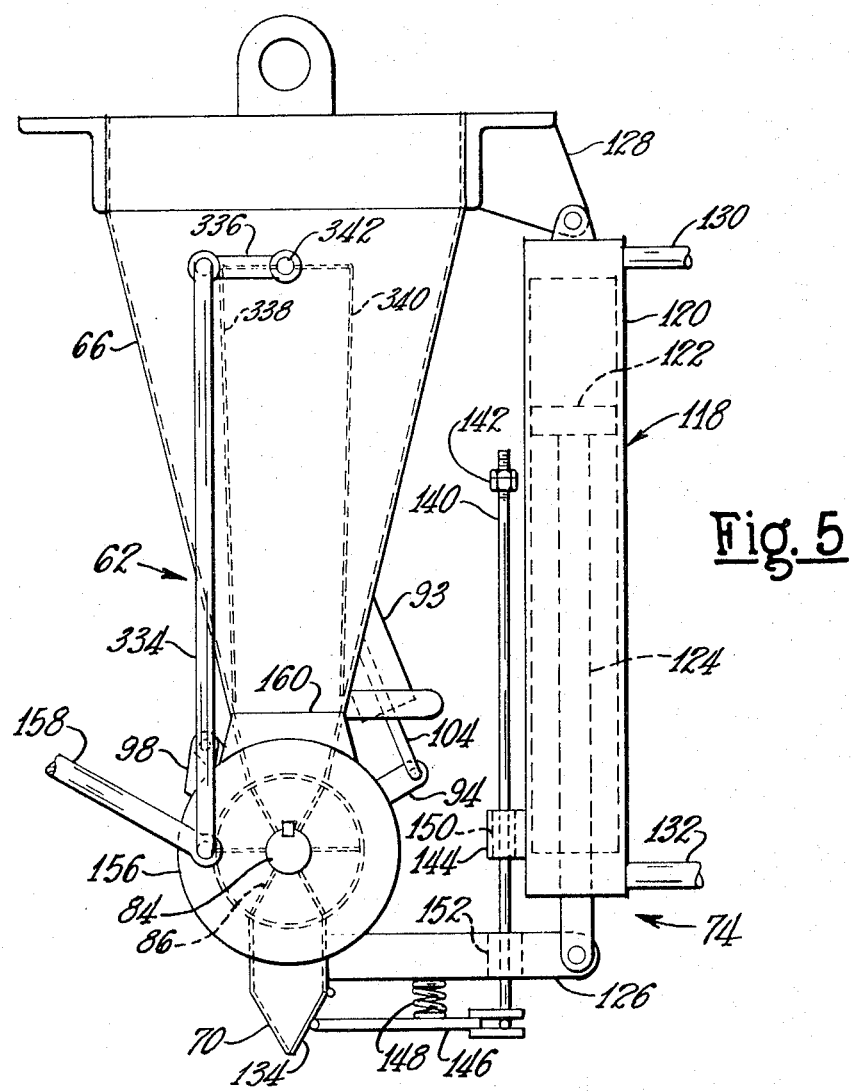
FIG. 5 is an enlarged end elevation view of the other end of the apparatus shown in FIGS. 3 and 4.

As more clearly seen in FIGS. 3–5, the distributing portion 62 further includes a batch disturbing means that moves with the stepped movement of the shaft 84 to continually alter the position of batch in the supplemental hopper 66. The batch disturbing means includes a longitudinal connector 334, a crank 336 and disturbing screens 338 and 340. The longitudinal connector 334 pivotally connects at one end to the wheel 156 at a location laterally offset from the wheel's center. The connector 334 extends upwardly to pivotally connect to one end of the crank 336 that connects to and extends radially on a shaft 342 at its other end. The shaft 342 runs lengthwise through the upper region of the supplemental hopper 66 and is movable about its longitudinal axis. Extending laterally on the shaft 342 is a screen support means 344 that holds the screens 338 and 340 in vertically disposed and spaced apart relationship. The screens extend downwardly within the supplemental hopper 66.

When the air motor 93 moves its associated drive means to step the shaft 84 about its longitudinal axis, the screens 338 and 340 move in generally opposite directions, i.e. one screen moves upwardly and the other screen moves downwardly. As the shaft 84 moves, the wheel 156 drives the connector upwardly and downwardly in crank-like fashion. In turn, the connector 334 moves the crank 336 around the axis of the shaft 342 to rotate the laterally extending screen support means 344 by intermittent movement. The screen support means 344 moves the screens 338 and 340 to disturb batch in the supplemental hopper 66, such movement precluding batch "caking" or "hang-up".

What is claimed is:

1. Apparatus for supply of particulate batch mineral material to a surface of a molten mineral body in a high temperature region for melting such material comprising:
   a supply of particulate batch mineral material located away from the high temperature region;
   transport means located away from the high temperature region for carrying particulate material;
   means effective to intermittently load the transport means with a body of the particulate material from the supply and to move the loaded transport means from its location away from the high temperature region to a location adjacent the collection surface to position the body of material as a whole at the collection surface;
   means for releasing the body of particulate material from the transport means at the collection surface; and
   means for moving the transport means to a position away from the high temperature region after release of the body of particulate material.

2. Apparatus for supplying batch to a body of molten glass comprising:
   a movably mounted transport means located away from the high temperature of the body of molten glass;
   hopper means for holding batch effective to load the transport means with a body of such batch at a location away from the high temperature of the molten glass;
   means for moving the batch loaded transport means to a location adjacent the surface of the body of molten glass;
   means for releasing the body of batch at the surface of the molten glass from the loaded transport means during its location adjacent the surface of molten glass to discourage tendencies of the batch to disperse to the atmosphere; and
   means for moving the emptied transport means away from the high temperature adjacent the surface of the molten glass sufficiently quickly after release of the batch to maintain the temperature of the transport means substantially below the temperature of the molten glass.

3. Apparatus for supplying batch to molten glass comprising:
   a melting receptacle with at least a partially open top, the melting receptacle including means for heating batch mineral material to molten glass;
   a movably mounted delivery container spaced above the melting receptacle away from the high temperature of the molten glass;
   hopper means for supplying a body of batch to the delivery container at a location above the melting receptacle;
   means for moving the delivery container loaded with the body of batch downwardly to a location at the upper surface of the molten glass in the melting receptacle;
   means for releasing the body of batch to the molten glass from the delivery container at the location at the surface of the molten glass to discourage tendencies of batch to disperse to the atmosphere; and
   means for moving the empty container to a location away from the high temperature of the molten glass.

4. Apparatus recited in claim 3 where the means for moving the delivery container moves the container to a location closely adjacent to the body of molten glass.

5. Apparatus for producing continuous glass fibers comprising:
   a melting receptacle having at least a partially open top and a partially open bottom, the melting receptacle including means for heating batch to molten glass;
   a supply hopper for holding batch spaced a distance above the melting receptacle away from the high temperature of molten glass held in the receptacle, the bottom region of the supply hopper having an opening through which batch exits, the bottom of the supply hopper including a rotary metering means across the hopper's exit opening;
   a longitudinal container movably mounted at the hopper's exit to receive batch;
   means for intermittently rotating the rotary metering means to transfer a body of batch from the supply hopper to the container and for moving the loaded container with the body of batch downwardly to a location closely adjacent to the surface of molten glass in the melting receptacle;
   means for discharging the body of batch from the container to the molten glass at the location closely adjacent to the surface of the molten glass to discourage tendencies for batch to disperse to the atmosphere; and
   means for returning the container to its location at the hopper's exit sufficiently quickly after discharge of the batch from the container to maintain the temperature of the container substantially below the temperature of the molten glass.

6. Apparatus according to claim 5 where the longitudinal hopper extends an entire length of a receptacle wall.

7. Apparatus according to claim 6 further including means to progressively move the batch discharge location across the surface of the molten glass.

8. Apparatus according to claim 7 where the longitudinal container includes a door at its bottom region.

9. Apparatus according to claim 8 further including means for intermittently disturbing the batch in the supply hopper.

10. Apparatus for supply of particulate batch material to the surface of molten glass in a melting receptacle comprising:

a supply of particulate batch material located away from the high temperature of the molten glass;

transport means for the batch material, such transport means being located away from the high temperature of the molten glass;

means effective to load the transport means with a body of the batch material at a location away from the high temperature of the molten glass;

means for intermittently moving the loaded transport means to a location at the surface of molten glass;

means for releasing the body of batch material from the transport means during location of such means at the surface of the molten glass; and means for withdrawing the transport means to a position away from the high temperature of the molten glass after release of the body of batch material.

11. Apparatus of claim 10 in which the transport means is a container including a bottom wall having an opening through which batch material leaves the container and means for controlling release of batch material through such opening.

12. Apparatus of claim 11 in which the means for loading the container is a hopper holding the particulate batch material.

References Cited

UNITED STATES PATENTS

| | | | |
|---|---|---|---|
| 1,822,705 | 9/1931 | Mambourg | 65—335 X |
| 2,804,981 | 9/1957 | La Plante | 65—335 X |
| 3,193,119 | 7/1965 | Blaine | 65—335 X |
| 3,264,076 | 8/1966 | Veazie et al. | 65—2 |

ROBERT L. LINDSAY, JR., Primary Examiner

U.S. Cl. X.R.

65—1, 11 R, 135